(12) United States Patent
Moore

(10) Patent No.: US 8,309,260 B2
(45) Date of Patent: Nov. 13, 2012

(54) OXYGEN-CONSUMING BATTERY WITH IMPROVED HIGH RATE CAPABILITY

(75) Inventor: William J. Moore, Lakewood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 2 days.

(21) Appl. No.: 13/179,637

(22) Filed: Jul. 11, 2011

(65) Prior Publication Data

US 2011/0269030 A1 Nov. 3, 2011

Related U.S. Application Data

(63) Continuation of application No. PCT/US2010/027276, filed on Mar. 15, 2010.

(60) Provisional application No. 61/160,469, filed on Mar. 16, 2009.

(51) Int. Cl.
*H01M 8/22* (2006.01)

(52) U.S. Cl. .......................................... 429/403

(58) Field of Classification Search ........................ None
See application file for complete search history.

(56) References Cited

U.S. PATENT DOCUMENTS

| | | | |
|---|---|---|---|
| 5,312,476 A | 5/1994 | Uemura et al. |
| 5,464,709 A | 11/1995 | Getz et al. |
| 5,733,676 A | 3/1998 | Dopp et al. |
| 5,795,667 A | 8/1998 | McKenzie et al. |
| 6,492,046 B1 | 12/2002 | Payne et al. |
| 6,500,575 B1 | 12/2002 | Shiue et al. |
| 6,558,828 B1 | 5/2003 | Guo |
| 6,602,629 B1 | 8/2003 | Guo et al. |
| 6,641,947 B1 | 11/2003 | Molloy et al. |
| 2002/0150814 A1 | 10/2002 | Causton et al. |
| 2003/0049508 A1 | 3/2003 | Iarochenko et al. |
| 2003/0186099 A1 | 10/2003 | Liu et al. |
| 2006/0246353 A1 | 11/2006 | Guo et al. |
| 2007/0099050 A1 | 5/2007 | Pozin et al. |
| 2007/0117023 A1 | 5/2007 | Takamura et al. |
| 2008/0226976 A1 | 9/2008 | Stimits |
| 2008/0254345 A1 | 10/2008 | Broburg et al. |

FOREIGN PATENT DOCUMENTS

WO 02/35641 A1 5/2002

OTHER PUBLICATIONS

Patent Cooperation Treaty (PCT), International Search Report and Written Opinion for Application No. PCT/US2010/027276, filed Mar. 15, 2010, mailed Oct. 8, 2010, Korean Intellectual Property Office, Republic of Korea.

*Primary Examiner* — Barbara Gilliam
*Assistant Examiner* — Stephan Essex
(74) *Attorney, Agent, or Firm* — Russell H. Toye, Jr.

(57) ABSTRACT

An oxygen-consuming battery, such as a metal-air cell or fuel cell battery using oxygen from outside the battery as an active material, and having an improved high rate capability is disclosed. After the battery has been put into use, a light sacrificial drain is placed on the battery during periods when the battery is not being used to provide power in order to reduce degradation in rate capability that can occur over time, particularly when the battery is being used intermittently. Also disclosed is a combination of the oxygen-consuming battery and an electronic device that can be powered by the battery.

15 Claims, 9 Drawing Sheets

FIG. 9

| | | \multicolumn{9}{c}{TIME (DAYS)} | | | | | | | | |
|---|---|---|---|---|---|---|---|---|---|---|
| | Resistance (Ω) | 0 | 21 | 70 | 119 | 169 | 177 | 281 | 372 | 476 |
| LOT 1 | 1210 | 1.364 | 1.311 | 1.018 | 0.000 | 0.000 | 0.000 | 0.000 | 0.000 | 0.000 |
| | 2000 | 1.373 | 1.338 | 1.067 | 0.987 | 0.008 | 0.000 | 0.000 | 0.000 | 0.000 |
| | 2670 | 1.368 | 1.342 | 1.054 | 1.030 | 0.001 | 0.000 | 0.000 | 0.000 | 0.000 |
| | 3330 | 1.376 | 1.182 | 1.044 | 1.028 | 0.001 | 0.000 | 0.000 | 0.000 | 0.000 |
| | 4200 | 1.371 | 1.349 | 1.055 | 0.012 | 0.000 | 0.000 | 0.000 | 0.000 | 0.000 |
| | 5800 | 1.372 | 1.346 | 1.068 | 0.039 | 0.000 | 0.000 | 0.000 | 0.000 | 0.000 |
| | 7500 | 1.370 | 1.352 | 1.156 | 1.070 | 0.005 | 0.000 | 0.000 | 0.000 | 0.000 |
| | 9110 | 1.371 | 1.360 | 1.174 | 0.007 | 0.000 | 0.000 | 0.000 | 0.000 | 0.000 |
| | 10870 | 1.373 | 1.362 | 1.229 | 1.068 | 0.004 | 0.000 | 0.000 | 0.000 | 0.000 |
| | 12470 | 1.366 | 1.359 | 1.247 | 1.132 | 0.015 | 0.000 | 0.000 | 0.000 | 0.000 |
| | 14220 | 1.372 | 1.361 | 1.256 | 0.154 | 0.006 | 0.000 | 0.000 | 0.000 | 0.000 |
| LOT 2 | 1210 | 1.335 | 1.325 | 1.289 | 0.000 | 0.000 | | 0.000 | 0.000 | 0.000 |
| | 2000 | 1.359 | 1.338 | 1.273 | 1.287 | 0.000 | | 0.000 | 0.000 | 0.000 |
| | 2670 | 1.369 | 1.343 | 1.339 | 1.330 | 1.128 | | 0.000 | 0.000 | 0.000 |
| | 3330 | 1.371 | 1.346 | 1.346 | 1.340 | 1.326 | | 0.000 | 0.000 | 0.000 |
| | 4200 | 1.379 | 1.350 | 1.352 | 1.345 | 1.339 | | 0.006 | 0.000 | 0.000 |
| | 5800 | 1.375 | 1.354 | 1.359 | 1.353 | 1.349 | | 1.332 | 0.000 | 0.000 |
| | 7500 | 1.381 | 1.355 | 1.362 | 1.359 | 1.356 | | 1.349 | 1.329 | 0.000 |
| | 9110 | 1.386 | 1.356 | 1.368 | 1.364 | 1.362 | | 1.356 | 1.350 | 1.311 |
| | 10870 | 1.384 | 1.352 | 1.368 | 1.366 | 1.363 | | 1.359 | 1.355 | 1.344 |
| | 12470 | 1.385 | 1.354 | 1.373 | 1.368 | 1.365 | | 1.359 | 1.354 | 1.334 |
| | 14220 | 1.386 | 1.359 | 1.375 | 1.370 | 1.369 | | 1.365 | 1.361 | 1.354 |
| LOT 3 | 1000 | 1.343 | 1.317 | 0.012 | 0.000 | 0.000 | | 0.000 | 0.000 | 0.000 |
| | 1000 | 1.341 | 1.313 | 0.008 | 0.000 | 0.000 | | 0.000 | 0.000 | 0.000 |
| | 1614 | 1.359 | 1.332 | 1.327 | 0.000 | 0.000 | | 0.000 | 0.000 | 0.000 |
| | 1620 | 1.329 | 1.013 | 1.012 | 0.986 | 0.000 | | 0.000 | 0.000 | 0.000 |
| | 2100 | 1.322 | 1.315 | 1.314 | 1.281 | 0.000 | | 0.000 | 0.000 | 0.000 |
| | 2107 | 1.349 | 1.326 | 1.323 | 1.295 | 0.000 | | 0.000 | 0.000 | 0.000 |
| | 2665 | 1.367 | 1.341 | 1.342 | 1.332 | 0.024 | | 0.000 | 0.000 | 0.000 |
| | 2670 | 1.354 | 1.334 | 1.334 | 1.323 | 0.949 | | 0.000 | 0.000 | 0.000 |
| | 3320 | 1.368 | 1.341 | 1.343 | 1.336 | 1.322 | | 0.000 | 0.000 | 0.000 |
| | 4620 | 1.364 | 1.343 | 1.345 | 1.340 | 1.336 | | 1.224 | 0.000 | 0.000 |
| | 4640 | 1.370 | 1.347 | 1.326 | 1.351 | 1.347 | | 1.265 | 0.000 | 0.000 |
| | 5930 | 1.359 | 1.325 | 1.305 | 1.341 | 1.339 | | 1.331 | 1.226 | 0.000 |
| | 5950 | 1.379 | 1.352 | 1.359 | 1.355 | 1.352 | | 1.342 | 0.008 | 0.000 |
| | 7090 | 1.379 | 1.353 | 1.362 | 1.358 | 1.356 | | 1.351 | 1.323 | 0.000 |
| | 7110 | 1.362 | 1.345 | 1.350 | 1.346 | 1.344 | | 1.341 | 1.317 | 0.000 |
| | 8500 | 1.382 | 1.352 | 1.365 | 1.361 | 1.359 | | 1.356 | 1.350 | 1.286 |
| | 8510 | 1.366 | 1.346 | 1.355 | 1.351 | 1.349 | | 1.345 | 1.341 | 1.291 |
| | 9800 | 1.370 | 1.348 | 1.358 | 1.354 | 1.353 | | 1.350 | 1.346 | 1.335 |
| | 9840 | 1.386 | 1.355 | 1.371 | 1.368 | 1.366 | | 1.362 | 1.358 | 1.341 |
| | 11000 | 1.369 | 1.346 | 1.362 | 1.366 | 1.365 | | 1.364 | 1.361 | 1.352 |
| | 11260 | 1.373 | 1.346 | 1.362 | 1.358 | 1.356 | | 1.353 | 1.350 | 1.343 |

FIG. 10

| | | TIME (DAYS) | | | | | | | | |
|---|---|---|---|---|---|---|---|---|---|---|
| | Resistance (Ω) | 0 | 21 | 70 | 119 | 169 | 177 | 281 | 372 | 476 |
| LOT 1 | 1210 | 100% | 73% | 14% | 3% | 3% | 3% | 3% | 3% | 3% |
| | 2000 | 100% | 83% | 47% | 17% | 13% | 13% | 13% | 13% | 13% |
| | 2670 | 100% | 87% | 60% | 38% | 33% | 33% | 33% | 33% | 33% |
| | 3330 | 100% | 90% | 69% | 50% | 47% | 47% | 47% | 47% | 47% |
| | 4200 | 100% | 92% | 76% | 69% | 69% | 69% | 69% | 69% | 69% |
| | 5800 | 100% | 94% | 82% | 74% | 74% | 74% | 74% | 74% | 74% |
| | 7500 | 100% | 96% | 86% | 77% | 76% | 76% | 76% | 76% | 76% |
| | 9110 | 100% | 96% | 88% | 85% | 85% | 85% | 85% | 85% | 85% |
| | 10870 | 100% | 97% | 90% | 84% | 83% | 83% | 83% | 83% | 83% |
| | 12470 | 100% | 97% | 91% | 86% | 82% | 82% | 82% | 82% | 82% |
| | 14220 | 100% | 98% | 92% | 88% | 88% | 88% | 88% | 88% | 88% |
| LOT 2 | 1210 | 100% | 73% | 10% | -1% | -1% | | -1% | -1% | -1% |
| | 2000 | 100% | 83% | 45% | 8% | -3% | | -3% | -3% | -3% |
| | 2670 | 100% | 88% | 58% | 30% | 1% | | 0% | 0% | 0% |
| | 3330 | 100% | 90% | 67% | 43% | 20% | | 1% | 1% | 1% |
| | 4200 | 100% | 92% | 73% | 55% | 36% | | 1% | 1% | 1% |
| | 5800 | 100% | 94% | 81% | 67% | 53% | | 23% | 8% | 8% |
| | 7500 | 100% | 96% | 85% | 75% | 64% | | 40% | 21% | 4% |
| | 9110 | 100% | 96% | 88% | 79% | 70% | | 50% | 34% | 16% |
| | 10870 | 100% | 97% | 90% | 82% | 75% | | 58% | 45% | 30% |
| | 12470 | 100% | 97% | 91% | 85% | 78% | | 64% | 52% | 39% |
| | 14220 | 100% | 98% | 92% | 86% | 81% | | 68% | 58% | 46% |
| LOT 3 | 1000 | 100% | 67% | 3% | 3% | 3% | | 3% | 3% | 3% |
| | 1000 | 100% | 67% | 3% | 3% | 3% | | 3% | 3% | 3% |
| | 1614 | 100% | 79% | 32% | -1% | -1% | | -1% | -1% | -1% |
| | 1620 | 100% | 83% | 47% | 12% | -1% | | -1% | -1% | -1% |
| | 2100 | 100% | 84% | 48% | 12% | 0% | | 0% | 0% | 0% |
| | 2107 | 100% | 84% | 48% | 12% | 0% | | 0% | 0% | 0% |
| | 2665 | 100% | 88% | 58% | 29% | 3% | | 3% | 3% | 3% |
| | 2670 | 100% | 88% | 59% | 30% | 2% | | 1% | 1% | 1% |
| | 3320 | 100% | 90% | 67% | 43% | 19% | | 1% | 1% | 1% |
| | 4620 | 100% | 93% | 76% | 59% | 42% | | 4% | 1% | 1% |
| | 4640 | 100% | 93% | 76% | 61% | 44% | | 6% | 1% | 1% |
| | 5930 | 100% | 94% | 82% | 69% | 55% | | 25% | 2% | -2% |
| | 5950 | 100% | 94% | 81% | 68% | 54% | | 24% | 2% | 2% |
| | 7090 | 100% | 95% | 84% | 73% | 62% | | 36% | 16% | 4% |
| | 7110 | 100% | 95% | 84% | 73% | 62% | | 37% | 17% | 5% |
| | 8500 | 100% | 96% | 87% | 77% | 68% | | 47% | 30% | 10% |
| | 8510 | 100% | 96% | 87% | 78% | 68% | | 47% | 30% | 11% |
| | 9800 | 100% | 97% | 89% | 81% | 72% | | 54% | 39% | 22% |
| | 9840 | 100% | 97% | 89% | 80% | 72% | | 35% | 21% | 4% |
| | 11000 | 100% | 97% | 90% | 83% | 75% | | 59% | 46% | 30% |
| | 11260 | 100% | 97% | 90% | 83% | 76% | | 60% | 47% | 32% | ns # OXYGEN-CONSUMING BATTERY WITH IMPROVED HIGH RATE CAPABILITY

This application is a continuation of International Application No. PCT/US2010/027276, filed Mar. 15, 2010, which claims the benefit of U.S. Provisional Application No. 61/160,469, filed Mar. 16, 2009, both of which are fully incorporated herein by reference.

BACKGROUND OF THE INVENTION

This invention relates to oxygen-consuming electrochemical batteries and cells with improved high rate and high power discharge capability, particularly during intermittent use.

Electrochemical battery cells that use oxygen from outside the cell as an active material to produce electrical energy can be used to power a variety of portable electronic devices. Oxygen enters the cell, where it can be used as an active material in the oxygen consuming (e.g., positive) electrode, where the oxygen consuming electrode promotes the reaction of the oxygen with the cell electrolyte and, ultimately, oxidation of the counter (e.g., negative) electrode active material. The material in the oxygen consuming electrode that promotes the reaction of oxygen with the electrolyte is often referred to as a catalyst. However, some materials used in these electrodes are not true catalysts because they can be at least partially reduced, particularly during periods of relatively high rate cell discharge.

One example of an oxygen consuming cell is an oxygen-depolarized metal/air cell in which air from outside the cell enters the cell, and the oxygen is reduced by the positive, or air, electrode. The negative electrode active material is a metal, such as zinc, that is oxidized during cell discharge. A metal/air cell generally has an aqueous alkaline (e.g., KOH) electrolyte. Another example of an oxygen consuming cells is a fuel cell.

An advantage of an oxygen consuming cell such as a metal/air cell is its high energy density, since at least a portion of the active material of the positive electrode comes from outside the cell, thereby either reducing the cell volume or making more volume available for the negative electrode active material.

Oxygen consuming cells can have a maximum discharge rate. The maximum discharge rate can limited by the rate at which oxygen can enter the oxygen consuming electrode. In the past, efforts have been made to increase the rate of oxygen entry into cell and/or limit the rate of entry of undesirable gases, such as carbon dioxide, that can cause undesirable reactions, as well as limit the rate of water entry or loss that can fill void space in the cell intended to accommodate the increased volume of discharge reaction products or dry the cell out, respectively. Examples of these approaches can be found in U.S. Pat. No. 6,558,828; U.S. Pat. No. 6,492,046; U.S. Pat. No. 5,795,667; U.S. Pat. No. 5,733,676; U.S. Patent Publication No. 2002/0150814; and International Patent Publication No. WO02/35641. However, changing the diffusion rate of one of these gases generally affects the others as well. Even when efforts have been made to balance the need for a high rate of oxygen diffusion and low rates of $CO_2$ and water diffusion, there has been only limited success.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans and pumps have been used to force air into cells (e.g., U.S. Pat. Nos. 6,500,575 and 6,641,947 and U.S. Patent Publication No. 2003/0186099), but such air movers and controls for them can add cost and complexity to manufacturing, and fans, even micro fans, can take up valuable volume within individual cells, multiple cell battery packs and devices.

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508). However, the pressure differential may be small and can be affected by atmospheric conditions outside the battery.

Commonly assigned U.S. Patent Publication No. 2008/0254345 discloses a valve that is operated by an actuator that responds to changes in a potential applied across the actuator to open and close the valve. The rate at which oxygen can enter the cell is minimized when the cell is not being used to provide power, but the valve opens and the rate of oxygen entry into the cell increases as the demand for power increases.

All of these prior art approaches have one or more disadvantages. For example, it may be necessary to compromise by limiting either high rate discharge performance in order to minimize cell deterioration during periods of no or low rate discharge or the total useful life of the cell in order to provide the desired high rate discharge capability. Valves, fans and electronic controls can be used to increase the maximum discharge rate, but these components can add complexity and cost, use a portion of the cell capacity to operate these components, and take up valuable space within cells, batteries or devices being powered by the batteries.

It is an object of the invention to provide an oxygen-depolarized battery, containing one or more air depolarized cells, such as metal/air cells, that has excellent high rate and high power discharge capability. It is also an object of the invention to provide an improved oxygen-depolarized battery with minimal added complexity and cost, that consumes minimal discharge capacity, and takes little if any additional space within the cell, battery or device in which the battery is used. It is a further object of the invention to provide a means of improving the discharge rate capability of a battery that can be used in combination with other desired cell, battery and device features and controls, such as air managers for controlling the movement of oxygen and other gases into and out of the cell.

SUMMARY OF THE INVENTION

According to one aspect of the invention a battery for providing power to operate an electronic device is disclosed. The battery comprises one or more oxygen consuming cells, and the one or more oxygen consuming cells comprise a housing with one or more oxygen entry ports, an first, oxygen consuming, electrode disposed in the housing, a second, counter, electrode disposed in the housing, an electrolyte disposed in the housing, a first electrical contact terminal in electrical contact with the first electrode, and a second electrical contact terminal in electrical contact with the second electrode. Oxygen from outside the housing is able to enter the housing to reach the oxygen consuming electrode. When the battery is ready for use and not providing power to operate the electronic device, an electrical circuit is complete between the first and second terminals of at least one of the oxygen consuming cells, and the electrical circuit comprises a sacrificial drain on the at least one of the oxygen consuming cells.

According to another aspect of the present invention a combination of a battery for providing power to operate an electronic device and the electronic device that can be operated by the battery is disclosed. The battery comprises one or more oxygen consuming cells, and the one or more oxygen consuming cells comprise a housing with one or more oxygen entry ports, an first, oxygen consuming, electrode disposed in the housing, a second, counter, electrode disposed in the housing, an electrolyte disposed in the housing, a first electrical contact terminal in electrical contact with the first electrode, and a second electrical contact terminal in electrical contact with the second electrode. Oxygen from outside the housing is able to enter the housing to reach the oxygen consuming electrode. When the battery is ready for use and not providing power to operate the electronic device, an electrical circuit is complete between the first and second terminals of at least one of the oxygen consuming cells, and the electrical circuit comprises a sacrificial drain on the at least one of the oxygen consuming cells.

These and other features, advantages, and objects of the present invention will be further understood and appreciated by those skilled in the art by reference to the following specification, claims, and appended drawings.

Unless otherwise specified herein, all disclosed characteristics, values and ranges are as determined at room temperature (20-25° C.) and ambient atmospheric pressure and relative humidity.

BRIEF DESCRIPTION OF THE DRAWINGS

In the drawings:

FIG. 9 is a table summarizing cell voltages during storage for embodiments of the invention; and FIG. 10 is a table summarizing cell capacity remaining for embodiments of the invention.

DETAILED DESCRIPTION OF THE PREFERRED EMBODIMENTS

Figure 1:
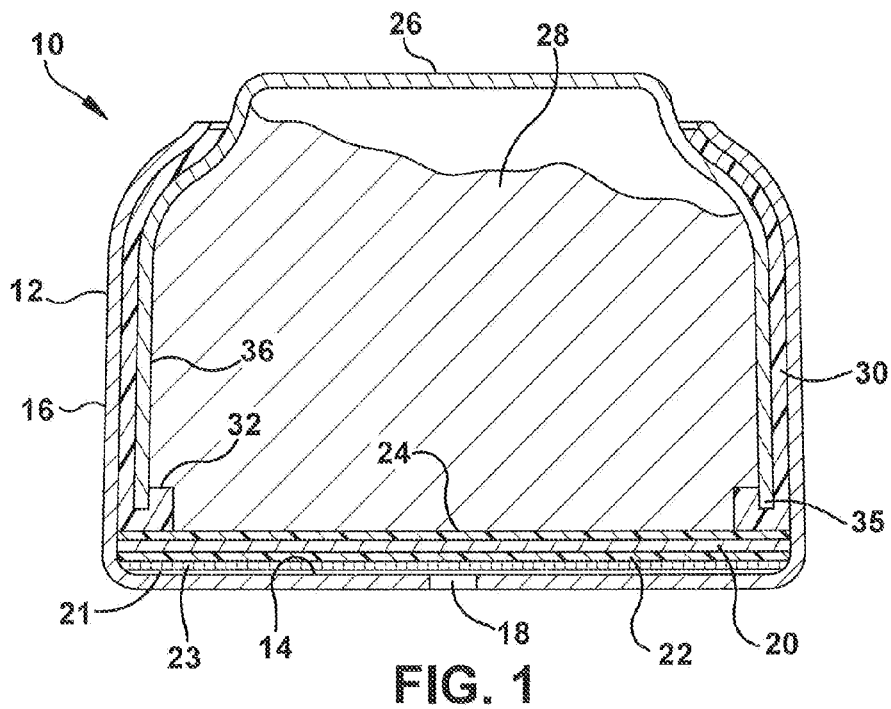
FIG. 1 is an elevational view, in cross-section, of a button shaped cell according to one embodiment.

The invention includes a battery with at least one oxygen-consuming cell that uses oxygen from outside the cell as an active material for one of the electrodes. The cell has an electrode that consumes the oxygen and a counter electrode. For example, the cell can be a metal-air cell in which the positive electrode (which may be referred to below as a cathode) that reduces the oxygen and a negative electrode (which may be referred to below as a cathode) that contains a metal, such as zinc in a zinc-air cell, as the negative electrode active material that is oxidized during discharge of the cell. A zinc-air cell can have an aqueous alkaline electrolyte, such as potassium hydroxide, sodium hydroxide and/or lithium hydroxide in water. In another example, the cell can be a fuel cell in which the active materials for both electrodes come from outside the cell, and the active material for one of the electrodes is oxygen.

While it is generally desirable to restrict or prevent oxygen from entering the cell when it is not needed for powering a device, in order to avoid unnecessary loss in discharge capacity, this is not always practical. However, it has been discovered that not only the discharge capacity, but also the rate capability (the maximum current or power that can be delivered during discharge) of a cell that uses oxygen as an active material can deteriorate over time when the cell is not being used. This is particularly evident in cells that have been prepared for or put into use such that oxygen is available to the oxygen consuming electrode.

While not wishing to be bound by theory, it is believed that the deterioration in rate capability is the result of undesired reaction of one or more impurities, such as carbon dioxide, entering the cell with the oxygen. In particular, it is believed that carbon dioxide reacts with the electrolyte, and the reaction product causes damage to the oxygen consuming electrode. For example, in a zinc-air cell with an aqueous alkaline electrolyte containing potassium hydroxide, reaction (I) can take place:

$$CO_2 + 2KOH \rightarrow K_2CO_3 + H_2O \qquad (I)$$

The potassium carbonate produced can crystallize if its concentration in the electrolyte present in the air electrode exceeds the saturation limit. The solid potassium carbonate may precipitate in the pores of the air electrode and reduce the available reaction area, expand and damage the electrode, block air ingress into the air electrode and reduce the ionic conductivity of the electrolyte. The formation of water in reaction I can also increase the vapor pressure of water within the cell and cause loss of water from the cell, which can also contribute to a reduction in the cell rate capability.

Atmospheric air typically contains about 20.9476 volume percent oxygen and about 0.0314 volume percent carbon dioxide, or about 0.15 volume percent carbon dioxide, based on the volume of oxygen, at 15° C. and a pressure of 101325 Pa. Carbon dioxide levels at and above the levels typically found in atmospheric air have been found to cause degradation in the rate capability of oxygen-consuming cells, and it is expected that carbon dioxide at lower levels can cause noticeable degradation as well. It is believed that when as little as 0.05 volume percent or less carbon dioxide, based on the volume of oxygen, at 15° C. and 101,325 Pa pressure, can also be detrimental when sources of oxygen other than atmospheric air are used.

It has also been discovered that degradation of the rate capability of a cell that oxygen can enter when it is ready for use but not being used to providing energy, such as to operate a device, can be substantially reduced by putting the cell on a light sacrificial discharge (e.g., through a high resistance load between the positive and negative terminals of the cell, or by otherwise discharging the cell at low current or low power). As used herein, a battery is ready for use when it has been removed from packaging in which it was sold, unsealed (e.g., an air access or air entry port covering such as a tab or tape is removed), or installed in an electronic device or other appliance to or from which the battery will be used to provide power.

In one embodiment the sacrificial drain is present at all times after the cell has been put into use, including those times when the cell is providing power to operate a device, for example. In another embodiment the sacrificial drain can be removed, so it is present when the cell is not providing power but not when the cell is providing to operate a device, for example. The sacrificial drain can be provided through an electrical circuit that is contained within the battery, or at least part of the circuit can be a part of the device in which the battery is being used. The sacrificial drain can be a part of a circuit that can be opened and closed, such as by a switch. The switch can be a switch that is also used to turn the device on and off, or it can be a separate switch. The switch can be operated manually, or it can be operated electronically. A control circuit can be used to open and close the electrical circuit including the sacrificial drain. The control circuit can be within the battery, or at least a portion of the control circuit can be within the device. The control circuit can also be used to determine a device mode, such that when the device is in a mode that does not draw power from the battery to operate a device function, the sacrificial drain is not connected to the battery. In yet another embodiment the sacrificial drain can be varied.

In order to minimize consumption of cell discharge capacity, it is desirable to use a sacrificial discharge that is sufficient, but not substantially more than the minimum required, to reduce the deterioration of rate capability. An optimum background drain can be determined empirically through experimentation, depending on the desired minimum rate capability and expected cell use regimen.

Placing an oxygen consuming cell, into which oxygen can enter and reach the oxygen consuming electrode, on a light sacrificial discharge when the cell is not in use can be particularly advantageous when undesirable fluid impurities such as carbon dioxide are present with the oxygen, as when air is used as a source of oxygen.

Figure 2:
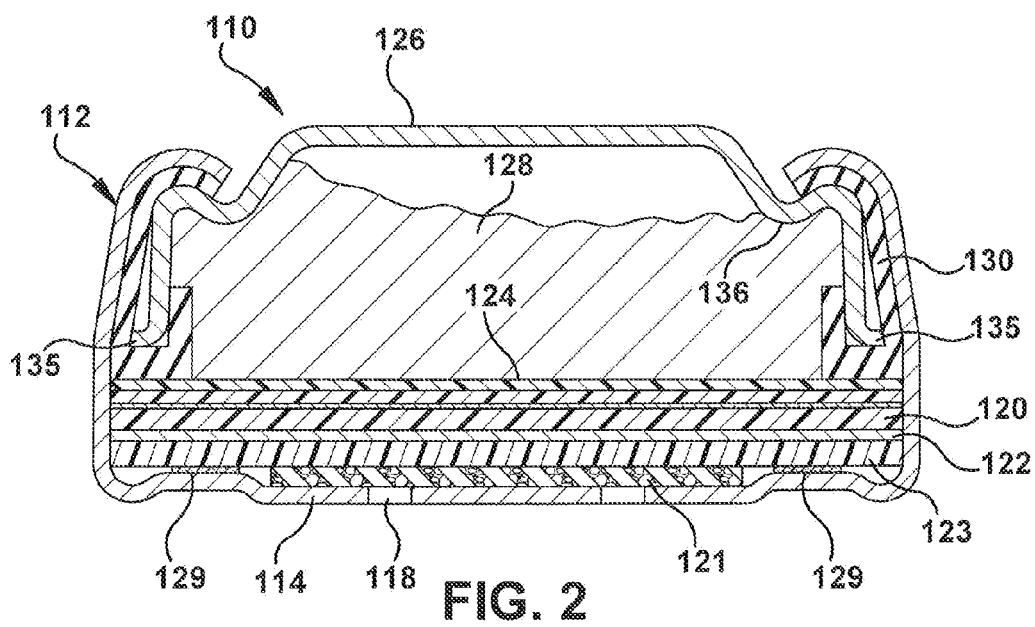
FIG. 2 is an elevational view, in cross-section, of a prismatic shaped type cell according another embodiment.

While the invention can be used with any type of oxygen consuming cell or battery, it can be particularly advantageous for metal-air cells and fuel cells, particularly those which use atmospheric air as a source of oxygen. Features of the invention are described in further detail below in embodiments with metal-air cells, such as those shown in FIGS. 1 and 2. The cell in FIG. 1 is a button cell with a cylindrical cross section and a maximum height that is less than its diameter, and the cell in FIG. 2 is a prismatic cell having a non-cylindrical cross section, though the invention can be used advantageously with oxygen-consuming cells of other sizes, shapes and configurations. Button cell 10 includes a negative electrode (anode) casing 26 that is generally a cup-shaped metal component. Cell 10 includes a positive electrode (cathode) casing 12 that is cup-shaped, and is preferably formed of nickel-plated steel such that it has a relatively flat central region 14 which is continuous with and surrounded by an upstanding wall 16 of uniform height. Alternatively, the central region 14 of the bottom of the cathode casing 12 may protrude outward from the peripheral part of the bottom. At least one hole 18 is present in the bottom of cathode casing 12 to act as an air entry port. Prismatic cell 110 includes an anode casing 126 and a cathode casing 112, preferably formed of nickel-plated steel. Anode casing 126 and cathode casing 112 are generally prismatic-shaped, and preferably rectangular, with each casing 126, 112 defining four linear or nonlinear sidewalls connected to a base or central region, preferably substantially planar. Alternatively, cathode casing 112 can have a base with an area that protrudes outward from the peripheral part of the casing base. The casings can include single or multiple steps if desired.

Referring to FIGS. 1 and 2, a positive electrode, such as air electrode 20, 120 in a metal/air cell, is disposed in the cathode casing 12, 112, adjacent to the source of the oxygen, such as outside air entry ports 18, 118. The air electrode 20, 120 may contain any suitable catalyst material. In a zinc-air cell the air electrode 20, 120 can include a mixture of a conductive material such as carbon, a catalytic material such as manganese oxide ($MnO_x$), and a binder material such as polytetrafluoroethylene (PTFE). The air electrode 20, 120 preferably has a hydrophobic, oxygen permeable membrane layer 22, 122, such as a polytetrafluoroethylene (PTFE) film, laminated thereon. The PTFE layer 22, 122 is laminated on the side of the air electrode 20, 120 closest to the oxygen source. The air electrode 20, 120 can also contain a current collector, such as a metal screen (preferably made of nickel expanded metal) embedded therein on the opposite side of the air electrode 20, 120 from the hydrophobic layer 22, 122. The cell 10, 110 can also contain an additional water barrier membrane 23, 123, such as a PTFE film membrane, between the hydrophobic layer 22, 122 and the oxygen source. A layer of porous material 21, 121 can be positioned between air electrode 20, 120 and the cathode casing bottom 14, 114 to assist in evenly distribute air to electrode 20, 120. A sealant 129 can be used to bond portions of the air electrode to cathode casing 112. At least one layer of separator 24, 124 is positioned above air electrode 20, 120, between the air electrode 20, 120 and the negative electrode.

The anode casing 26, 126 forms the top of cell 10, 110. The anode casing 26, 126 preferably has a substrate including a material having a sufficient mechanical strength. The casing substrate in one embodiment is a single layer of material such as, but not limited to steel (e.g., stainless steel, mild steel, or cold rolled steel), aluminum, titanium, or copper, with mild steel preferred. The anode casing substrate can be pre-plated (plated prior to being formed into a casing) or clad with at least one additional layer. Preferred pre-plating and clad materials include, but are not limited to, nickel, copper, indium, tin and combinations thereof that can serve to prevent or minimize corrosion of the substrate. The anode casing 26, 126 can be post-plated (plated after being formed into a casing) to provide improved corrosion resistance and/or external appearance. In a preferred embodiment at least the inside surface of the formed anode casing 26, 126 comprises an alloy of copper, tin and zinc. Pre-plated or clad layers, or both, can provide an advantage of preventing any pinholes, damage, or other defects in the post-plated layer from exposing a lower hydrogen overvoltage substrate material, as well as promoting adhesion with subsequently applied layers.

During manufacture of the cell, anode casing 26, 126 can be inverted, and a negative electrode composition or anode mixture 28, 128 and electrolyte are put into anode casing 26, 126. The anode mixture insertion can be a two step process wherein dry anode mixture materials are deposited (e.g., dispensed) first into the concave portion of the anode casing 26, 126, followed by KOH solution dispensing, or the wet and dry components of the anode mixture can be blended beforehand and then deposited in one step into the anode casing 26, 126.

In an embodiment of an alkaline zinc/air cell the anode mixture 28, 128 can include zinc and aqueous alkaline electrolyte solution. Small amounts of additives can be included to inhibit gassing in the cell and/or improve performance. Examples include but are not limited to zinc oxide, indium hydroxide, a surfactant, and other organic and inorganic compounds. The anode mixture 28, 128 can also include a binder or gelling agent. Preferred zinc powders are low-gassing zinc compositions, especially for use in cells with no added mercury. Examples are disclosed in U.S. Pat. Nos. 6,602,629 (Guo et al.), 5,464,709 (Getz et al.) and 5,312,476 (Uemura et al.), which are hereby incorporated by reference. The composition of the anode mixture 28, 128 can be varied to provide the desired processing and cell performance characteristics.

The cell housing includes the cathode casing 12, 112 and the anode casing 26, 126, which are electrically insulated from and sealed to each other. In one embodiment the housing can include a gasket 30, 130 made from an electrically non-conductive, elastomeric material to provide the seal. The bottom edge of the gasket 30, 130 can have an inwardly facing lip 32, 132, which abuts the rim of anode casing 26, 126. A sealant may be applied to the sealing surface of the gasket 30, 130, cathode casing 12, 112 and/or anode casing 26, 126.

To assemble the cell 10, 110, the cathode casing 12, 112, including the inserted air electrode 20, 120, can be inverted and pressed downward against the anode cup/gasket assembly, which is preassembled with the anode casing 26, 126 inverted so the rim of the anode casing 26, 126 faces upward. While inverted, the edge of the cathode casing 12, 112 is deformed inwardly, so the rim 34, 134 of the cathode casing 12, 112 is compressed against the gasket 30, 130 to form a seal and an electrically insulating barrier between the anode casing 26, 126 and the cathode casing 12, 112.

A suitable tab (not shown) can be placed over the opening 18, 118 until the cell 10, 110 is ready for use to keep air from entering the cell 10 before use. Alternatively, the cell 10, 110 can be sealed in an airtight pouch or other container until ready for use.

When the cell is in use the rate of oxygen entering the cell 10, 110 can be limited by the number, size and locations of the openings 18, 188 in the cathode casing 12, 112. In some embodiments the rate of oxygen entry into the cell 10, 110 can be further controlled, such as by a fluid regulating system.

For example, the battery can also have a fluid regulating system for adjusting the rate of passage of oxygen to the positive electrode (e.g., the air electrode in an air-depolarized and cell) to provide a sufficient amount of oxygen from outside the cell for discharge of the cell at high rate or high power, while minimizing entry of other gases into the positive electrode and water gain or loss into or from the cell during periods of low rate or no discharge. The fluid regulating system can be relatively simple, such as a manually operated valve that is open when the battery is in use and closed when it is not, or it may be much more complex, such as the valve disclosed in US 2008/0254345, which is hereby incorporated by reference. The fluid regulating system can be located within the cell, within a battery containing the cell, within a device in which the battery is installed, or portions of the fluid regulating system can be located in more than one of the cell, the battery and the device.

Figure 3:
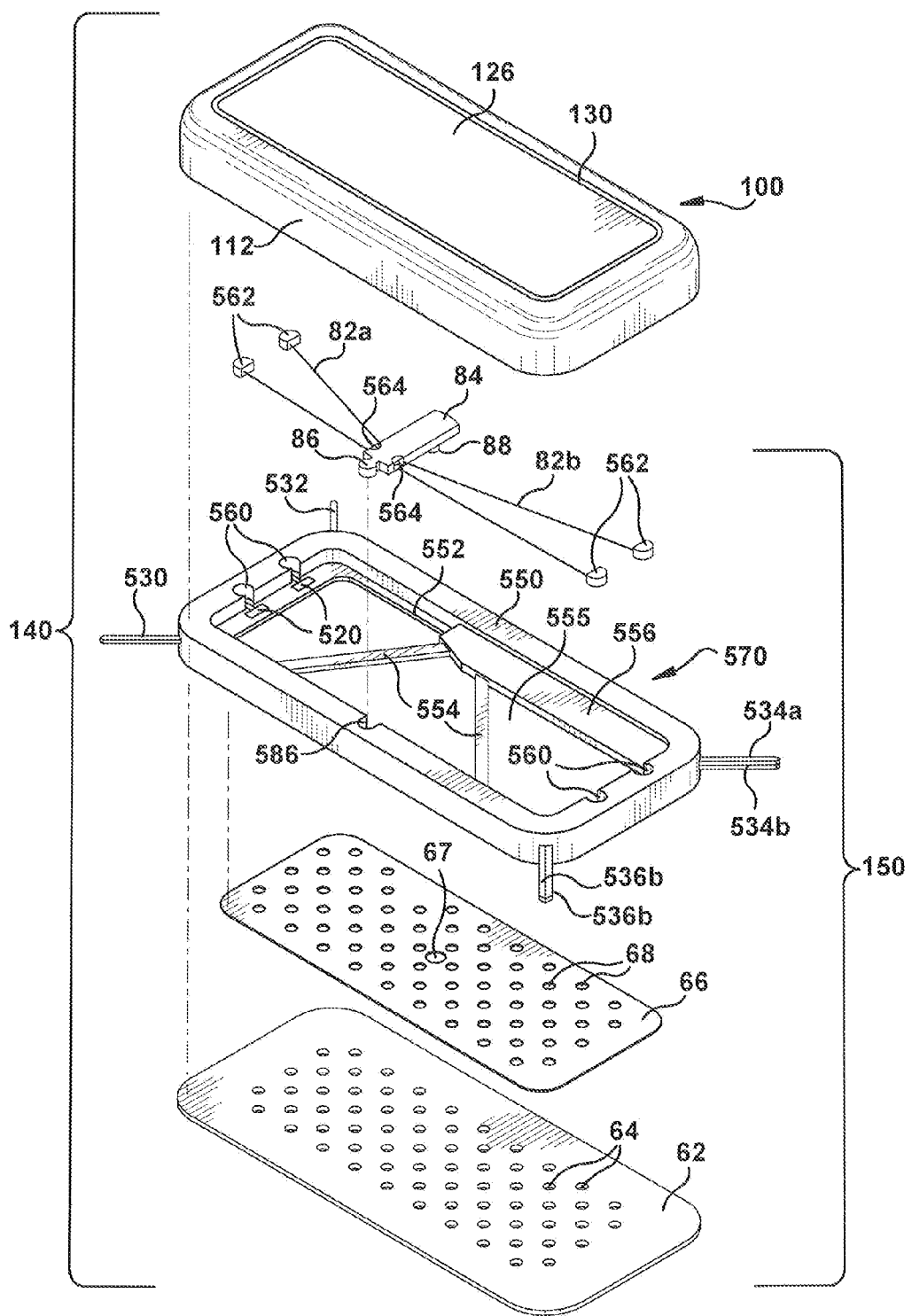
FIG. 3 is an exploded perspective view of the cell in FIG. 2 with a fluid regulating system according to one embodiment.

In one embodiment, shown in FIG. 3, a battery 140 includes cell 100 and a fluid regulating system 150. Casing 112 has a bottom surface 114 in which one or more air entry ports 118 are provided such that oxygen may pass to the interior of the cell housing so as to reach the positive electrode 40, and fluid regulating system 150 is secured to the exterior of bottom surface 114 of casing 112. The fluid regulating system 150 according to this particular embodiment may include a valve with a first plate 62 having a plurality of apertures 64 and a movable second plate 66 including a plurality of apertures 68 that correspond in size, shape, number, and position to apertures 64 formed in first plate 62. The size, shape, number, and position of apertures 64 and 68 are preferably optimized to provide the desired volume and distribution of fluid applied to the fluid consuming electrode. The size, shape, number and relative location of apertures, 64 do not have to be the same as the size, shape, number and relative location of apertures 68. For example, if apertures 64 are slightly different in size from apertures 68, precise alignment of apertures 64 and 68 is not essential to achieve the maximum total open area through plates 62 and 66.

Fluid regulating system 150 includes a chassis 550 with an electrically conductive frame and components integrally formed therein. The electrically conductive frame and the electrical components assembled thereon are substantially encapsulated within electrically non-conductive chassis 550. The chassis 550 generally defines a central opening 555 and includes an inward extending ledge 552. The periphery of the moving plate 66 is positioned on and abuts the bottom surface of the inward extending ledge 552. Additionally, the chassis 550 has ribs 554 which extend across the opening 555 above the moving plate 66. The ribs 554 are shown generally formed in V-shape extending diagonally through opening 555 and serve to hold the central portion of the moving plate 66 flat above the underlying fixed plate 62. In the embodiment shown, the fixed plate 62 is connected to the bottom side of the chassis 550, and the cell 100 is connected to the top side of the chassis 550. In this arrangement, fluid (e.g., oxygen and other gases) from the outside environment may enter the fluid entry ports of the cell 100 by way of the valve when the valve is open.

The chassis 550 is further illustrated having crimp connector openings 560 formed in desired locations and adapted to receive crimps 562 of the shape memory alloy (SMA) wire actuators 82a and 82b. The crimp connector openings 560 may be integrally formed during formation of the chassis 550 or may be subsequently formed by removing material (e.g., machining or etching) to form the desired opening shape and size. Extending from each of the crimp connector openings 560 are respective circuit elements of the frame 500 that serve as contact pads 520. Contact pads 520 are formed as part of the electrically conductive circuit elements of the frame 500 and are adapted to make electrical contact with the SMA wire actuators 82a and 82b to apply electrical current thereto. The frame 500 further includes a plurality of circuit elements that serve as battery contacts 530, 532, 534a, 534b, 536a and 536b extending from the chassis 550, each of which is adapted to be bent into contact with a terminal of the cell 100. The contacts 530, 532, 534a, 534b, 536a and 536b can extend from the corners, as shown, or from other portions of the chassis 550.

The fluid regulating system 150 includes a valve actuator including first and second SMA wires 82a and 82b. According to the embodiment shown, SMA wires 82a and 82b are connected to lever 84 by way of arcuate slots 564. Specifically, the first SMA wire 82a extends between end crimps 562 and one slot 564 and may be activated to pull the lever 84 in one direction to open the valve, while the second SMA wire 82b is connected between end crimps 562 and the other slot 564 to pull lever 84 in the opposite direction to close the valve. Lever 84 includes an actuator pin 88 which engages moving plate 66 to move the plate 66 between the open and closed valve positions as discussed herein. While the valve actuator is shown and described herein employing two SMA wires 82a and 82b connected via respective arcuate slots 564 to a lever 84, it should be appreciated that other types and arrangements of valve actuators may be employed to actuate the moving plate 66 relative to the fixed plate 62 to open and close the valve. Further, it should be appreciated that while a generally linear actuation of moving plate 66 is shown and described herein, other configurations of valves may be employed to control the flow of oxygen to the cell 100.

Figure 4:
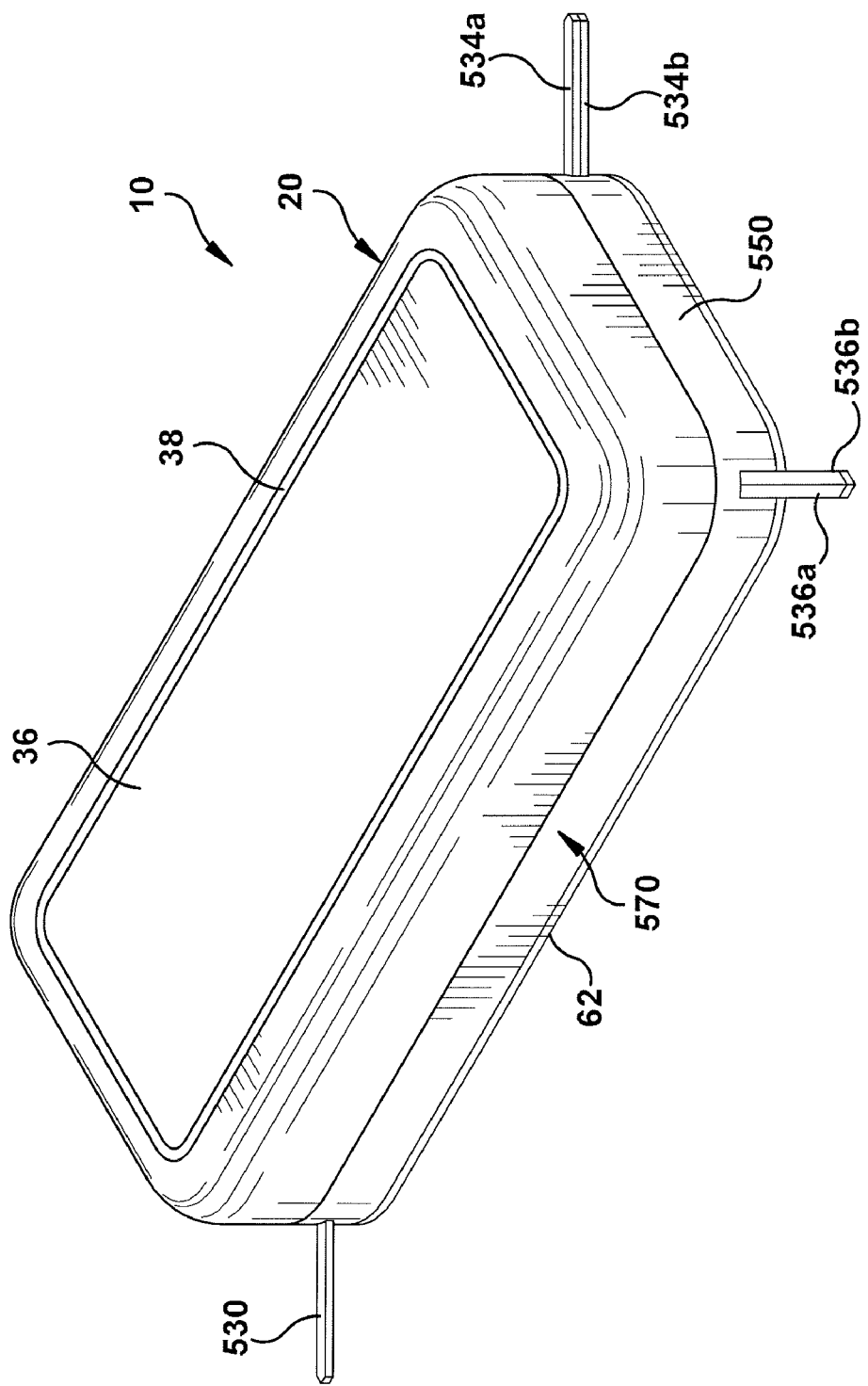
FIG. 4 is a perspective view of the cell in FIG. 3 following partial assembly of the cell and the fluid regulating system into a battery.
Figure 5:
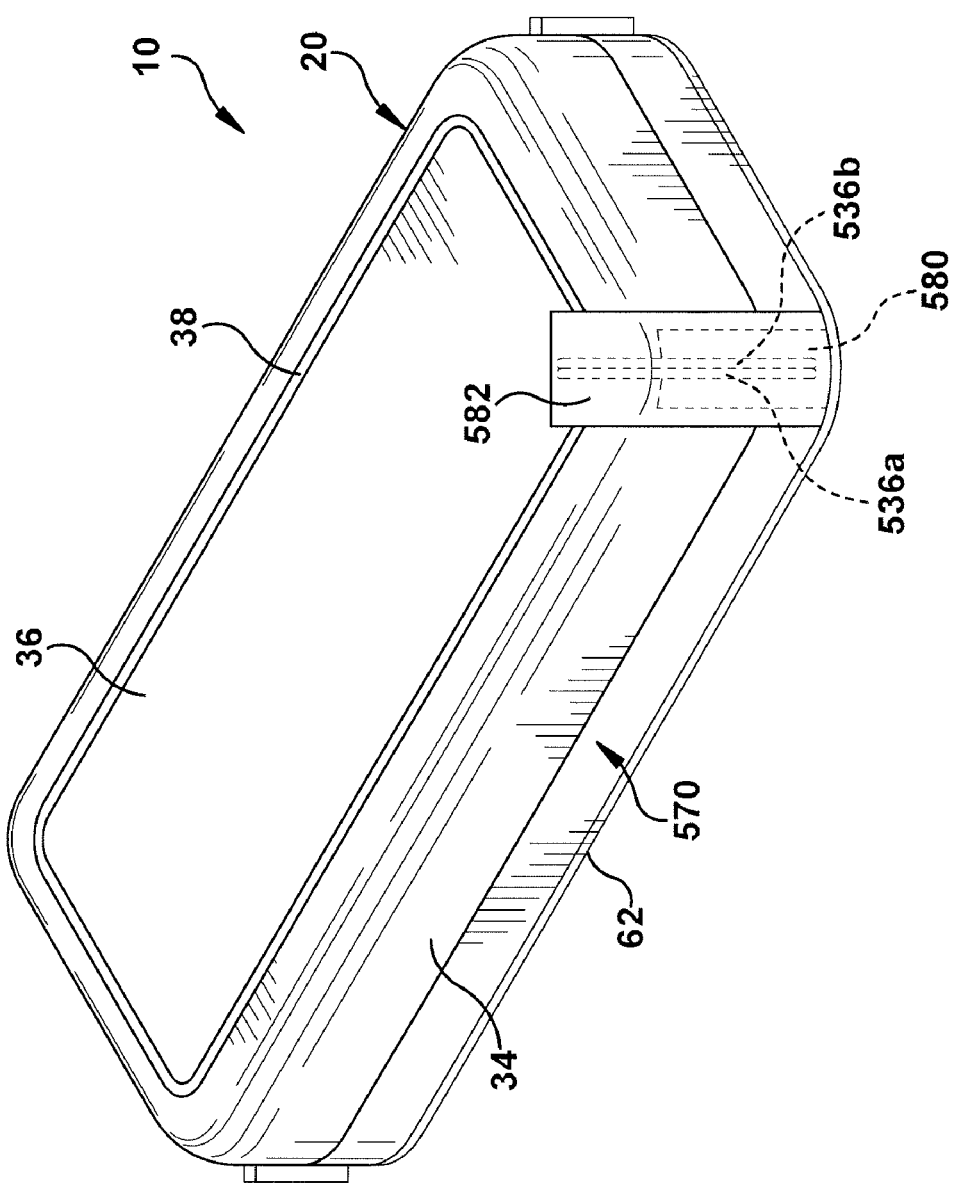
FIG. 5 is a perspective view of the completely assembled battery shown in FIG. 4.

Following assembly of the actuator and valve to the chassis 550, the cell 100 is assembled to the top surface of the chassis 550 as seen in FIG. 4. With the cell 100 attached to the chassis 550, the battery contacts are bent upwards and into contact with appropriate terminals of the cell 100. In the embodiment shown, battery contacts 530, 534a and 534b are bent upwards and into contact with the side wall of the can 34 which forms the positive terminal. It should further be appreciated that the battery contact 532 (not seen) likewise makes contact with the side wall of the casing 112 forming the positive terminal. The remaining battery contacts 536a and 536b are bent upwards and into contact with the casing 126 forming the negative terminal of the cell 100. An underlying electrically insulating tape 580 is applied below battery contacts 536a and 536b on the side wall of the casing 112 so as to electrically insulate contacts 536a and 536b from the positive battery terminal. The battery contacts 536a and 536b extend further beyond insulating tape 580 onto and in contact with the casing 126 forming the negative battery terminal. An overlying electrically insulating tape 582 is then applied over the battery contacts 536a and 536b as seen in FIG. 5.

In another embodiment, the fluid regulating system is incorporated into a device that can be powered by an oxygen-depolarized cell or a battery containing one or more cells. One such embodiment is disclosed in commonly assigned U.S. Application No. 61/139,651 filed Dec. 22, 2008, which is hereby incorporated by reference. In this embodiment, an oxygen depolarized cell or battery is installed in a device, and one or more components of the device restrict the flow of air from the external environment to the cell/battery. This can be done by positioning a flow restricting material between the point(s) of entry of air into to cell/battery and the exterior of the device, such that the maximum rate of flow of air to the cell/battery is less than an unimpeded rate of flow into the cell/battery.

Figure 6:
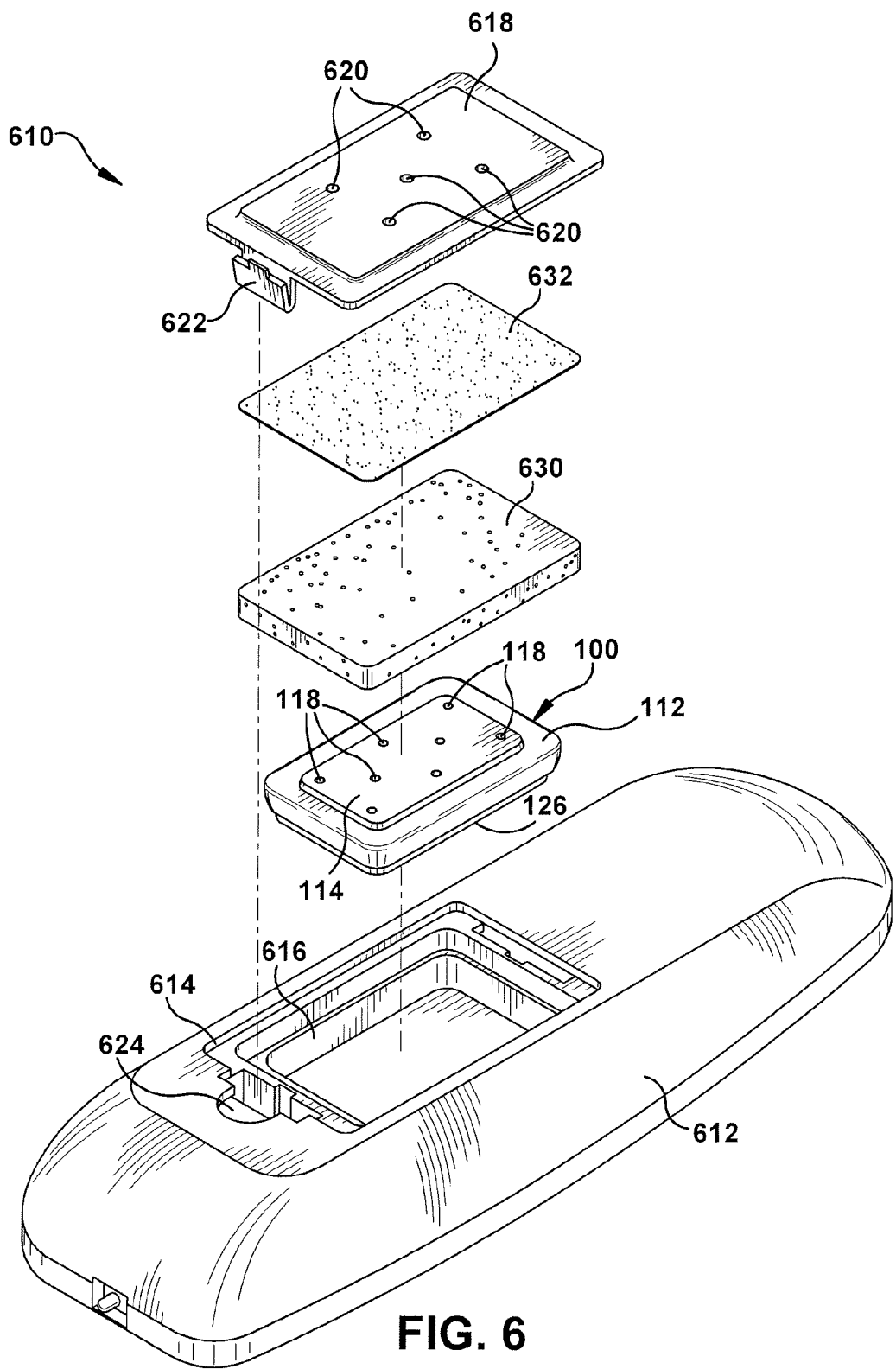
FIG. 6 is an exploded perspective view of a device with the battery in FIG. 2 installed.

An example is shown in FIG. 6, in which a battery consisting of one cell 100 is installed in a device 610. Cell 100 is inverted with the anode casing 126, which serves as the negative contact terminal, facing the interior of the battery compartment 616. The device 610 has a housing 612 with top, bottom and side walls and an opening 614 leading to the battery compartment 616 formed in the housing 612. The battery compartment 616 includes the opening 614 configured with a size and shape adapted to receive one or more cells 100. While a single cell 100 is illustrated, the device 610 can employ one or more individual cells 100 or a battery containing one or a plurality of cells 100.

The device 610 generally includes electrical connections (not shown) that allow for electrical contact to be made between each of the cells 100 and electrical circuitry within the device 610. The electrical connections may include conductive contacts arranged in the battery compartment 616 so as to make contact with the side of cathode casing 112 and the downward facing surface of anode casing 126.

Included in the housing 612 is a lid or cover 618 that defines a top surface over the battery compartment 616. The cover may be opened by a user to allow access to the battery compartment 16 and may be closed to cover the battery compartment 616 and cell 100. To ensure closure of the cover 618, cover 618 may include a locking tab 622 that engages a slot 624 in the device housing 612 to hold the cover 618 in the closed position. The user may actuate the tab 622 to disengage the connection with slot 624 and pivot the cover 618 to an open position, when the cell 100 needs to be removed and/or inserted.

The device 610 comprises an air manager in the form of a fluid flow restricting material 630 adhered to the interior surface of cover 618. The fluid flow restricting material 630 is shown as a single layer, fluid permeable and compressible material that provides fluid management between the outside environment and the air entry ports 118 of the cell 100. In addition, the material 630 provides a fluid seal against the top face of the cell 100 when the cover 618 is in the closed position. The seal provided by the material 630 may allow for permeation of air through the thickness of material 630 from openings 620 in the cover 618 to the air entry ports 118 in the cell 100, while preventing substantial fluid flow from the lateral sides of the material 630.

According to another embodiment, the material 630 may provided a first permeation path of a first permeation rate from the openings 620 to air entry ports 118 and a second permeation path from the lateral sides of material 630 at a second permeation rate, such that air may transfer in axially from the side, if desired. In yet another embodiment (not shown), the openings to the battery compartment 616 can be located outside the interface between the cover 618 and the material 630, such as in another surface of the battery compartment 616, and/or a gap between the cover 618 and the opening 614 can function as an opening for air to enter the battery compartment 616. In this latter embodiment, the material 630 provides a permeation path from a lateral side of the material 630 to the air entry ports 118. The material 630 may be configured in different ways, depending upon the application of the device 610, so as to have different air permeation rates for different devices.

The fluid flow restricting material 630 can a loose layer, it can be adhered to the adjacent surface 114 of the cell 100, or it can be adhered to the inside surface of cover 618 by way of an adhesive layer 632. The adhesive of layer 632 may include an acrylic based adhesive, for example. By adhering the fluid flow restricting material 630 to the inside surface of the cover 618, the material 630 may be easily used with different cells or batteries as different cells or batteries are installed into and exchanged from the device 610. In one embodiment, the adhesive 632 may be arranged on the fluid flow restricting material 630 so as not to block the openings 620 in the cover 618. According to other embodiments, the adhesive 632 may cover the openings 620 and may be selected to act as a fluid permeation control layer having a desired air or fluid permeation to regulate fluid flowing therethrough. In another embodiment the fluid flow restricting material can be adhered to another interior surface of the battery compartment 616; openings 620 can be located in the lid 614 or another portion of the battery compartment, and/or a gap between the cover 618 and the opening 614 can function as a fluid entry port.

The fluid flow restricting material 630 can have a shape and size similar to the adjacent surface 114 of the cell 100 and consume the volume of space between the cover 618 and the cell 100, particularly in the area between the air entry ports 42 and cover openings 620, when the cover 618 is closed. The fluid flow restricting material 630 controls fluid access based on the fluid permeability of the material 630. When the cover 618 of the battery compartment 616 is closed, the fluid flow restricting material 630 is compressed between the inside surface of the cover 618 and the adjacent surface 114 of the cell 100 to provide for a fluid seal against the surface 114 of the cell 100. According to one embodiment, the fluid flow restricting material 630 is a compressible foam that allows for dimensional variations in the cell 100 and battery compartment 616, including cover 618.

The fluid flow restricting material 630 restricts the flow of fluid from the outside atmosphere to the cell 100 at a controlled fluid permeation rate. The fluid flow restricting material 630 may be a foam material that is compressible and air restrictive and has one or more layers that act as a throttling mechanism for fluid to pass to the cell 100 in the device 610. The fluid restrictive material 630 also provides a predictable and reproducible seal against the surface 114 of the cell 100 and assures and maintains the fluid seal by way of compression due to the resiliency of the foam material 630. The surface of the foam material 630 against the cell 100 can restrict air diffusion, while the bulk of the material 630 can be highly non-restrictive to air. The surface of the bulk material opposite the formation of the seal to the cell 100 can be reliably secured to a device compartment wall, such as cover 618, by way of an adhesive; however, other suitable means of securing the material 630 can be used. The types of materials that the fluid restrictive material 630 may employ can vary, as the air seal requirements may vary as a function of the type of device and its application.

The foam material 630 may have an added skin layer on one or both sides, and one skin layer may be in contact with the surface 114 of the cell 100. The additional skin layer may include fluid restricting material, such as silicon rubber, to minimize lateral fluid (e.g., air) leakage (i.e., leakage at the interface between the foam layer 630 and the surface 114 of the cell 100). The air permeability of the foam material 630 and an added skin layer may be the same or may be different materials, such that the skin layer is a more restricting material that provides the air flow control. For example, the foam layer 630 may be formed with one or more skin layers by altering the foam material 630 with heat and/or chemicals to achieve a desired air permeation control layer. By melting or dissolving the surface of the foam material 630 to reduce the porosity thereof, a desired air or other fluid permeability may be achieved.

Example 1

PP355 prismatic aqueous alkaline zinc-air cells similar to the cell illustrated in FIG. 2 were made. The cathode casing was made from nickel plated steel, the anode casing was made from triclad nickel-stainless steel-copper with the copper layer on the inner surface, and a thermoplastic polymer gasket. The air electrode included a catalytic mixture containing a manganese oxide catalyst, carbon to provide electrical conductivity, and a polytetrafluoroethylene (PTFE) binder; a nickel expanded metal current collector; and a hydrophobic layer made from PTFE film laminated onto the side of the electrode facing the air entry ports in the cathode casing. A layer of PTFE film was placed adjacent to the air electrode, and a porous paper was placed adjacent to the air entry ports. The anode included a mixture of unamalgamated zinc powder, aqueous potassium hydroxide electrolyte, a crosslinked sodium polyacrylate binder, and additives, including indium hydroxide, zinc oxide, and an anionic surfactant. The separator included two layers of polypropylene film—a hydrophobic polypropylene membrane adjacent to the air electrode and a water-wettable non-woven polypropylene membrane adjacent to the negative electrode, with an adhesive containing a polyvinyl alcohol and a synthetic cellulose gum between the air electrode and the hydrophobic separator layer and between the hydrophobic and water-wettable separator layer.

The cells were divided into three lots, Lot 1 had all air entry ports in the cathode casing exposed, Lot 2 had all air entry ports except one in the center of the cell covered with a relatively non-porous polyester film tape with a silicone based adhesive, and Lot 3 had all air entry ports covered with a relatively porous medical tape to provide three levels of air access to the cells. This was done to simulate conditions in a device where the rate of air available to the cells was limited to varying degrees, due to limited air access to the battery compartment of the device or throttling of air access by an air manager incorporated into a device, battery or cell. The cells were tested by measuring limiting current to determine the relative rate of oxygen entry to the air electrodes and the rate capability for each lot.

Rate capabilities were determined in terms of limiting (steady state) current that can be delivered by fully open cells (i.e., with tape removed from cells in Lots 2 and 3) after 30 seconds at a constant voltage of 1.1 volt. The limiting current of selected cells from each lot was tested initially, and the remaining cells were then stored at room temperature and about 50 percent relative humidity. Periodically cells were removed from storage and tested for limiting current. The results are summarized in the Table below, which shows the average limiting current in mA for each lot of cells after storage for the times listed. The differences in initial (0 months) limiting current among the three lots were due to normal variability. The limiting current for Lot 1, with no restrictions on air entering the cells, dropped to 4 mA after 6 months. The limiting current for Lot 2, with the air entering the cells being restricted compared to the cells in Lot 1, also dropped with time, but at a slower rate than for Lot 1. The limiting current for Lot 3, with further restriction of air entering the cells, dropped at an even slower rate than for Lot 2. These results show that restricting the amount of air that can enter a cell will reduce its rate capability, degradation in rate capability occurs over time, and the rate of degradation in rate capability is slowed by restricting the amount of air that can enter the cell. These results are consistent with the theory described above that carbon dioxide entering the cell with the oxygen reacts with the electrolyte to form potassium carbonate, which has a detrimental effect on the rate capability of a cell with an oxygen consuming electrode such as a metal air cell. When the amount of air entering the cell is reduced, so is the amount of carbon dioxide entering the cell, thereby reducing the rate at which potassium carbonate is produced.

TABLE

| Time (months) | Lot 1 Limiting Current (mA) | Lot 2 Limiting Current (mA) | Lot 3 Limiting Current (mA) | Lot 1 Capacity Remaining (%) | Lot 2 Capacity Remaining (%) | Lot 3 Capacity Remaining (%) |
|---|---|---|---|---|---|---|
| 0 | 120 | 116 | 115 | 100 | 100 | 100 |
| 1 | 28 | 75 | 89 | 75 | 93 | 93 |
| 2 | 11 | 69 | 86 | 42 | 84 | 87 |
| 3 | 8 | 54 | 74 | 0 | 82 | 86 |
| 4 | 6 | 53 | 62 | 0 | 80 | 81 |
| 5 | 5 | 39 | 70 | 0 | 87 | 93 |
| 6 | 4 | 41 | 52 | 0 | — | — |

Selected cells from each lot were removed from testing and discharged at 25 mA constant current to 1.0 volt, and the discharge efficiency compared to a predetermined actual average maximum discharge capacity per cell was calculated. These results are also shown in the Table above. After two months, less than half of the capacity remained in the fully open cells in Lot 1. Cells in Lots 2 and 3 had substantial capacity remaining after 5 months but essentially none after 6 months.

Example 2

Additional cells from each of Lots 1, 2 and 3 in Example 1 were stored at room temperature and about 50 percent relative humidity, with various resistors placed across the terminals of the cells. The cells were periodically tested to determine voltage and limiting current. Limiting current was tested as described in Example 1. From the voltage measurements and resistances used, corresponding cell currents were calculated, the average current over time was used to estimate the total capacity used, and the discharge capacity remaining was estimated from the calculated total capacity used and a predetermined average discharge capacity per cell.

Figure 7:
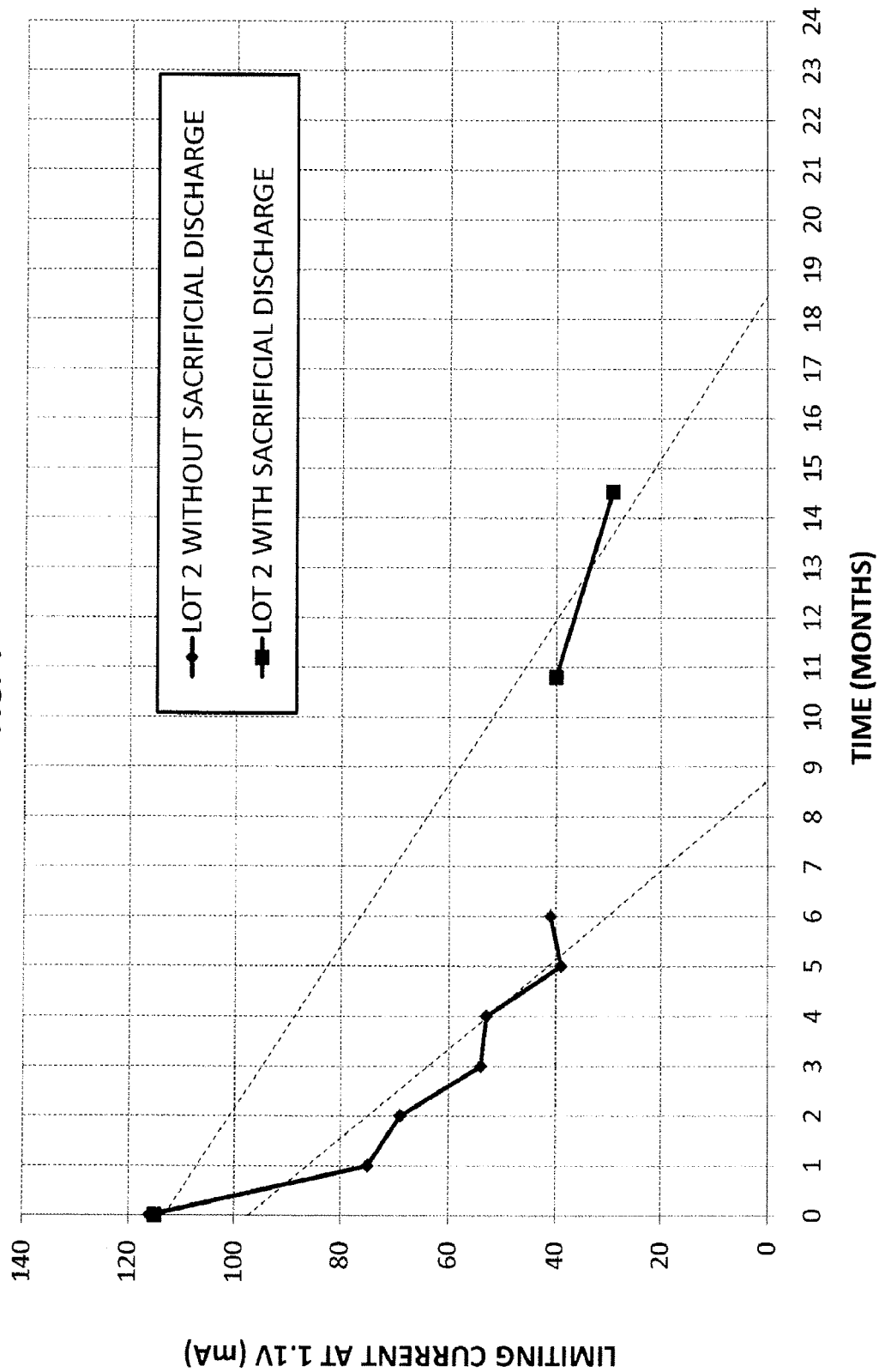
FIG. 7 is a graph of limiting current as a function of time comparing conventional cells with cells according to an embodiment of the invention.
Figure 8:
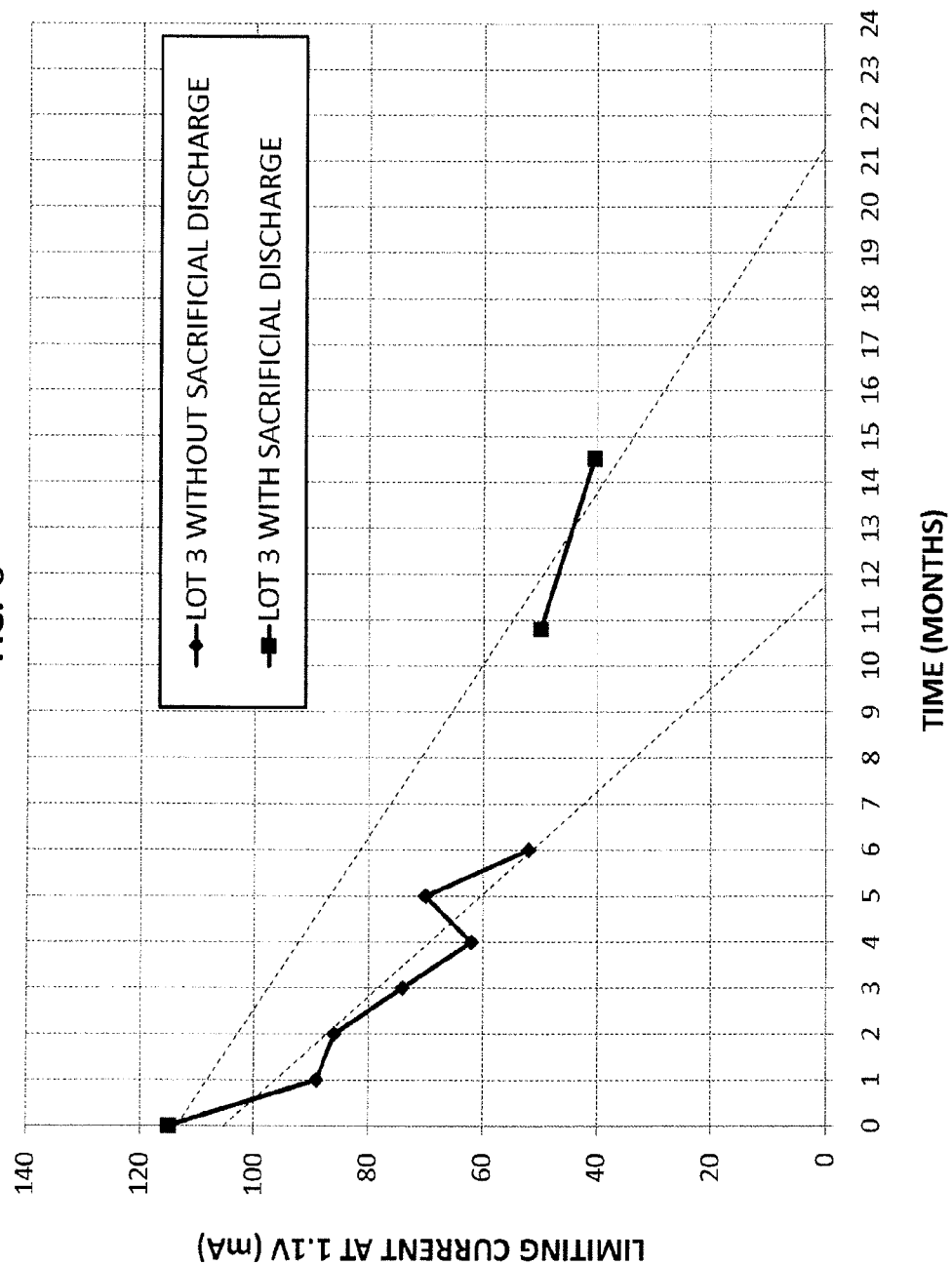
FIG. 8 is a graph of limiting current as a function of time comparing conventional cells with cells according to an embodiment of the invention.

FIG. 7 provides a graphical comparison for Lot 2 of the limiting current as a function of storage time for cells without resistors and cells with resistors (ranging from about 7,000 to 14,000 ohms) that provided the best improvement (i.e., least degradation) in limiting current over time. FIG. 8 provides similar comparisons for Lot 3 with and without 6,000 to 11,000 ohm resistors. FIGS. 7 and 8 show a substantial reduction in the rate of degradation of limiting current when cells were placed on a light sacrificial discharge using a resistor.

FIG. 9 is a partial summary of cell voltages, and FIG. 10 is a partial summary of remaining capacity for cells in Lots 1, 2 and 3 stored with resistors across their terminals.

A light sacrificial discharge can be used to substantially reduce the degradation in both cell voltage and rate capability that occurs over time after the cell has been activated. However, a light sacrificial discharge consumes a portion of the cell discharge capacity over time, so it is desirable to use as light of a sacrificial discharge as possible. The advantages of maintaining higher voltages and rate capabilities over time are best balanced against the disadvantages of consuming discharge capacity for a desired application to provide the best overall battery performance.

Other factors, such as ambient temperature and humidity, can also affect the rate of deterioration of the discharge rate capability of the cell. Testing can be done under different conditions besides those in the Examples above to help in the selection of the most suitable sacrificial discharge, depending on the environments in which the battery and device are expected to be used.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A battery for providing power to operate an electronic device comprising one or more metal-air cells, the one or more metal air cells comprising a housing with one or more oxygen entry ports, an first, oxygen consuming, electrode disposed in the housing, a second, counter, electrode disposed in the housing, an electrolyte disposed in the housing, a first electrical contact terminal in electrical contact with the first electrode, and a second electrical contact terminal in electrical contact with the second electrode; wherein:

oxygen from outside the housing enters the housing to reach the oxygen consuming electrode;

when the battery is ready for use and not providing power to operate the electronic device, an electrical circuit is complete between the first and second terminals of at least one of the metal-air cells; and the electrical circuit comprises a sacrificial drain on the at least one of the metal-air cells.

2. The battery as defined by claim 1, wherein the electrolyte is an aqueous alkaline electrolyte.

3. The battery as defined by claim 2, wherein the electrolyte comprises potassium hydroxide.

4. The battery as defined by claim 1, wherein the oxygen from outside the housing is contained in atmospheric air from outside the housing and contains at least 0.05 volume percent carbon dioxide, based on the volume of the oxygen at 15° C. and a pressure of 101,325 Pa.

5. The battery as defined by claim 1, wherein the rate of oxygen able to enter the housing is further restricted to less than the rate of oxygen able to enter the housing with the air entry ports unrestricted.

6. The battery as defined by claim 1, wherein the sacrificial drain is also present when the battery is providing power to operate the device.

7. A combination of the battery as defined by claim 1 and the electronic device that can be powered by the battery.

8. The combination of the battery and the electronic device as defined by claim 7, wherein the electrical circuit comprising the sacrificial drain is a part of the battery.

9. The combination of the battery and the electronic device as defined by claim 7, wherein the electrical circuit comprising the sacrificial drain is a part of the device.

10. The combination of the battery and the electronic device as defined by claim 7, wherein the electrical circuit comprising the sacrificial drain can be opened and closed.

11. The combination of the battery and the electronic device as defined by claim 10, wherein the electrical circuit comprising the sacrificial drain can be opened and closed by manually operating a switch.

12. The combination of the battery and the electronic device as defined by claim 11, wherein the switch is used to turn the device on and off.

13. The combination of the battery and the electronic device as defined by claim 10, wherein the electrical circuit comprising the sacrificial drain can be opened and closed electronically.

14. The combination of the battery and the electronic device as defined by claim 13, wherein the electrical circuit comprising the sacrificial drain can be opened and closed by a control circuit.

15. The combination of the battery and the electronic device as defined by claim 14, wherein the control circuit determines a device mode.

* * * * *